US012410653B2

(12) United States Patent
Kobel et al.

(10) Patent No.: US 12,410,653 B2
(45) Date of Patent: Sep. 9, 2025

(54) TOUCHLESS CONTROL SYSTEM

(71) Applicant: Transportation IP Holdings, LLC, Norwalk, CT (US)

(72) Inventors: Karl J. Kobel, Wildwood, IL (US); Benjamin R. Satkiewicz, Evanston, IL (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/965,296

(22) Filed: Oct. 13, 2022

(65) Prior Publication Data

US 2023/0146031 A1 May 11, 2023

Related U.S. Application Data

(60) Provisional application No. 63/276,034, filed on Nov. 5, 2021.

(51) Int. Cl.
*E05F 15/73* (2015.01)

(52) U.S. Cl.
CPC ........ *E05F 15/73* (2015.01); *E05F 2015/765* (2015.01); *E05Y 2900/51* (2013.01)

(58) Field of Classification Search
CPC . E05F 15/73; E05F 15/78; E05F 15/43; E05F 2015/765; E05Y 2900/506; E05Y 2900/51
USPC ........ 49/31
See application file for complete search history.

(56) References Cited

U.S. PATENT DOCUMENTS

| | | | | |
|---|---|---|---|---|
| 5,015,840 | A * | 5/1991 | Blau | F16P 3/144 250/221 |
| 6,080,981 | A * | 6/2000 | Payne | G01V 8/10 250/221 |
| 6,732,019 | B2 | 5/2004 | Spool et al. | |
| 7,488,029 | B2 | 2/2009 | Lechkun et al. | |
| 7,900,398 | B2 * | 3/2011 | Liles, Jr. | E05F 15/73 49/31 |
| 7,984,590 | B2 * | 7/2011 | Hoshide | E05F 15/73 49/31 |

(Continued)

FOREIGN PATENT DOCUMENTS

| | | | |
|---|---|---|---|
| CN | 110454027 | A | 11/2019 |
| EP | 2322748 | B1 | 1/2012 |

(Continued)

OTHER PUBLICATIONS

English translation of EP2952661 (Year: N/A).*
Extended European Search Report mailed Mar. 14, 2023 for corresponding Patent Application No. 22 203 548.7 (7 pages).

*Primary Examiner* — Justin B Rephann
(74) *Attorney, Agent, or Firm* — K&L Gates LLP

(57) ABSTRACT

A control system includes a sensor system that may detect entry of a person into a detection curtain in front of a door, and a controller that may receive a first signal from the sensor system indicating the entry of the person into the detection curtain. The controller may determine a state of the door and generate a second signal responsive to receiving the first signal and while the state of the door indicates that the door can be opened. The control system also may include one or more actuators that may be coupled with the door and to open the door without the person touching the door responsive to receiving the second signal from the controller.

12 Claims, 2 Drawing Sheets

(56) References Cited

U.S. PATENT DOCUMENTS

| | | | | |
|---|---|---|---|---|
| 8,791,839 | B2 | 7/2014 | Citta et al. | |
| 10,087,049 | B2 * | 10/2018 | Collins | B66B 13/26 |
| 10,353,523 | B2 | 7/2019 | Kobel et al. | |
| 10,619,397 | B2 * | 4/2020 | Gregoriou | E06B 9/68 |
| 11,066,276 | B2 * | 7/2021 | Schmidt | E05F 15/43 |
| 11,282,319 | B2 * | 3/2022 | Hewitt | G07C 9/00571 |
| 2007/0094932 | A1 * | 5/2007 | Hoshide | E05F 15/73<br>49/118 |
| 2012/0127317 | A1 * | 5/2012 | Yantek | E05F 15/73<br>348/E7.085 |
| 2015/0315834 | A1 * | 11/2015 | Collins | E05F 15/40<br>49/506 |
| 2015/0316410 | A1 * | 11/2015 | Collins | E05F 15/78<br>702/104 |
| 2017/0074039 | A1 * | 3/2017 | Gregoriou | E06B 9/68 |
| 2018/0209198 | A1 * | 7/2018 | Company | B66B 13/26 |
| 2019/0218847 | A1 * | 7/2019 | Agam | B66B 13/26 |
| 2019/0244453 | A1 * | 8/2019 | Hewitt | G07C 9/00 |
| 2019/0330026 | A1 * | 10/2019 | Schmidt | B66B 13/26 |

FOREIGN PATENT DOCUMENTS

| | | | | |
|---|---|---|---|---|
| EP | 2952661 | A1 * | 12/2015 | E05F 15/73 |
| WO | 2017048834 | A1 | 3/2017 | |
| WO | 2020182511 | A1 | 9/2020 | |

* cited by examiner

TOUCHLESS CONTROL SYSTEM

CROSS-REFERENCE TO RELATED APPLICATION

This application claims priority to U.S. Provisional Application No. 63/276,034 (filed 5 Nov. 2021), the entirety of which is incorporated herein by reference.

BACKGROUND

Technical Field

The subject matter described herein relates to systems that open doors (or actuate other devices) without requiring operators to touch the door and without requiring operators to touch controls associated with the door.

Discussion of Art

Opening doors currently may require touch of a handle or button associated with the door, or may require a person to move very close to the door (so that the hand or foot of the operator is within a sensed area of a sensor associated with the door). This can require or involve the person touching or landing on a panel of the door or other part of the door. For example, the range of the sensor may be limited such that the operator of the door may end up touching the door or other surface to open the door due to the operator having to move his or her hand very close to the door to be detected by the sensor. This can increase the risk of spreading communicable diseases, especially in situations where the door is used by many persons (e.g., a door of a transit vehicle or door of a publicly accessible building).

A need may exist for a touchless door system that eliminates the need for persons to touch a surface to open the door and/or come very close to the door (e.g., within a couple of centimeters of the door or surface associated with the door).

BRIEF DESCRIPTION

In one example, a control system is provided that includes a sensor system that may detect entry of a person into a detection curtain in front of a door, and a controller that may receive a first signal from the sensor system indicating the entry of the person into the detection curtain. The controller may determine a state of the door and generate a second signal responsive to receiving the first signal and while the state of the door indicates that the door can be opened. The control system also may include one or more actuators that may be coupled with the door and to open the door without the person touching the door responsive to receiving the second signal from the controller.

In another example, a method is provided that includes generating a detection curtain in front of a door using a sensor system, detecting entry of a person into the detection curtain, determining whether a state of the door indicates that the door can be opened, and opening the door without the person touching the door using one or more actuators responsive to detecting entry of the person into the detection curtain and determining that the state of the door indicating that the door can be opened.

In another example, a control system is provided that includes a sensor system that may detect entry of a person into a detection curtain in front of a device, and a controller that may identify the entry of the person into the detection curtain based on output from the sensor system. The controller may determine a state of the device and to output a signal responsive to identifying the entry of the person into the detection curtain and the state of the device indicating that the device can be actuated. The control system may include one or more actuators that may be coupled with the device and may change the state of the device without the person touching the device responsive to receiving the signal from the controller.

BRIEF DESCRIPTION OF THE DRAWINGS

The inventive subject matter may be understood from reading the following description of non-limiting embodiments, with reference to the attached drawings, wherein below.

DETAILED DESCRIPTION

Examples of the subject matter described herein relate to a touchless control system for a device that can sense an operator before the operator contacts a door or other device. The operator may be a passenger of the vehicle or another person. The operator my contact the door by touching the door with the hand, foot, elbow, etc. of the operator, and the subject matter described herein attempts to avoid this contact while still allowing the operator to control the door or other device. The system optionally can provide a visual indication of device (e.g., door) activation and/or the state of the door or other device (e.g., open or closed, locked or unlocked, etc.) to further reduce contact with the door or other device by informing operators when it is safe to activate the device (e.g., open the door), when the device may be moving between states, etc.

Figure 1:
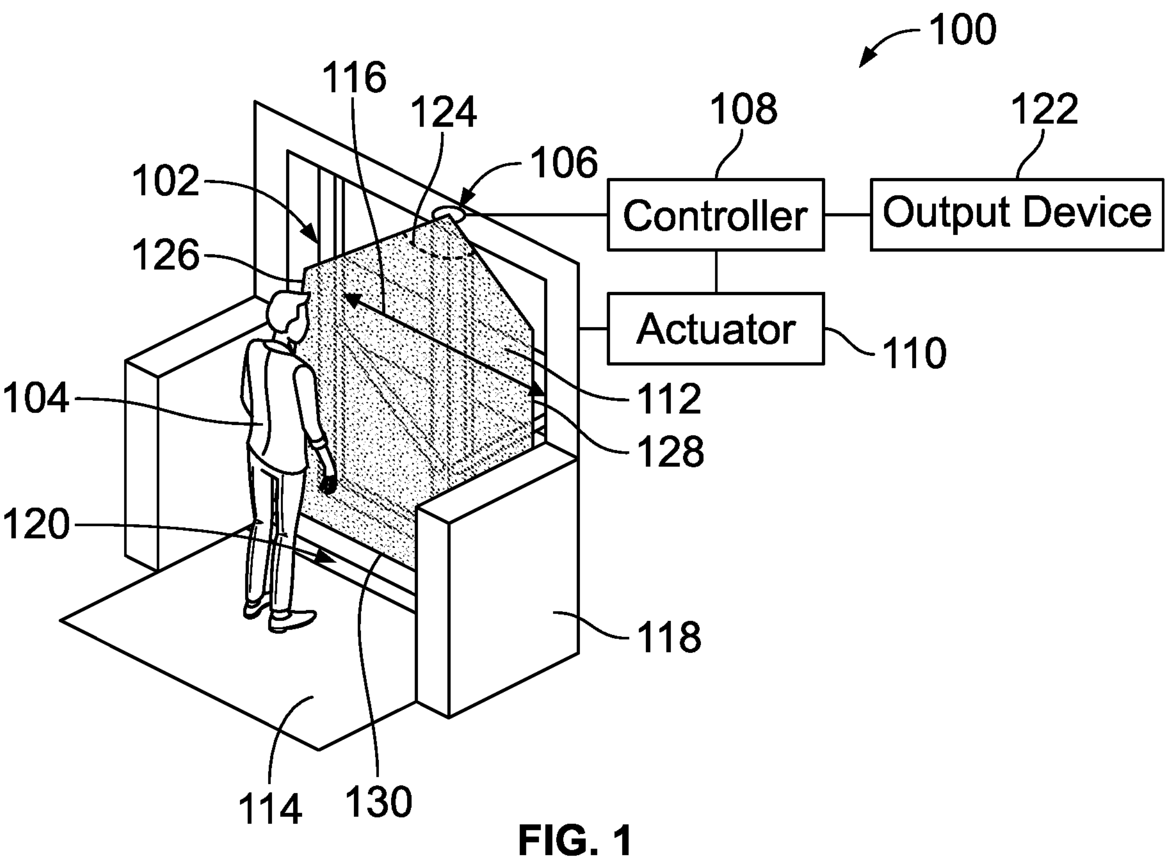
FIG. 1 illustrates one example of a touchless door system.
Figure 2:
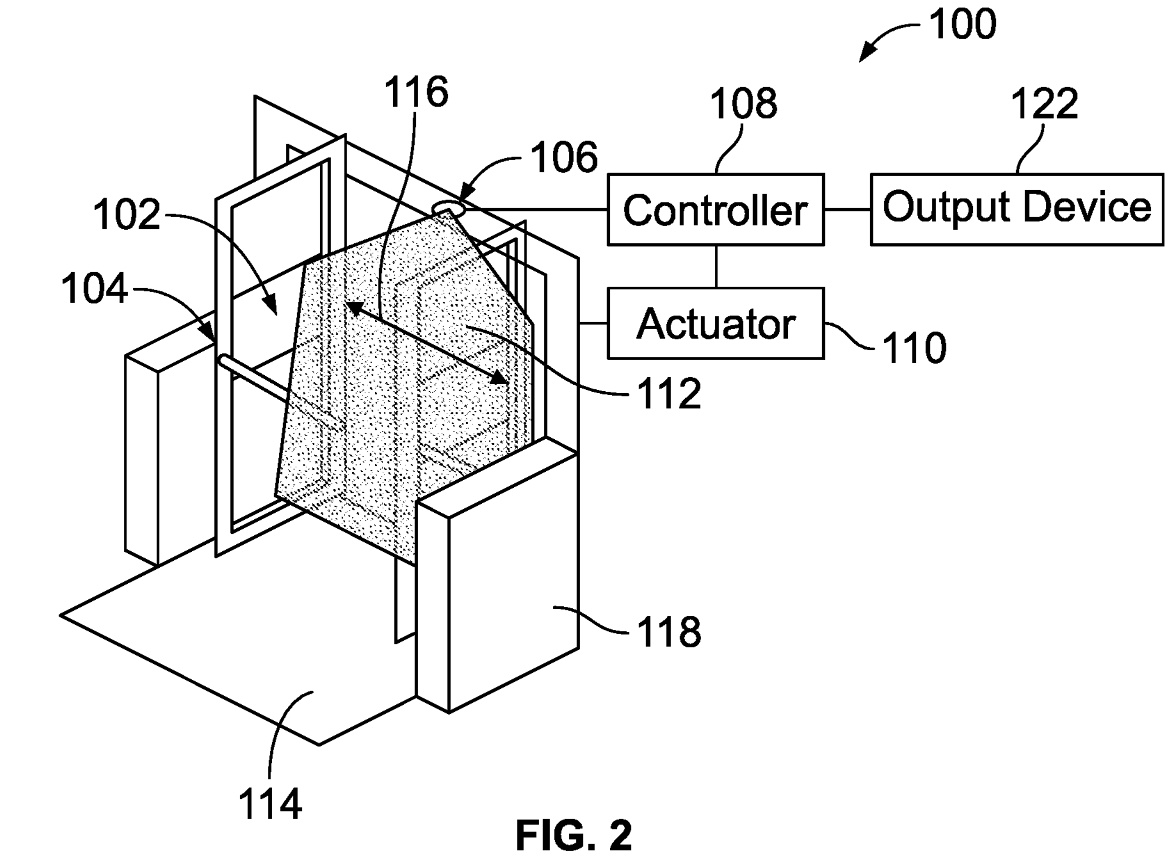
FIG. 2 illustrates the door system in FIG. 1 with a door opened by the door system.

FIG. 1 illustrates one example of a touchless door system 100. FIG. 2 illustrates the door system in FIG. 1 with a door 102 opened by the system. The system can actuate the door without requiring an operator 104 to touch the door or a surface associated with the door and/or without requiring the operator to come into close proximity (e.g., less than a centimeter) of the door or a surface associated with the door. The door and system may be disposed onboard a transit vehicle, such as a transit rail vehicle, bus, or the like. Optionally, the door and system may be disposed in a building or other location. Although embodiments are illustrated as relating to controlling opening of doors, other embodiments relate to controlling devices more generally through touchless actuation.

The system includes one or more sensor systems 106 that may detect a presence of the operator, a controller 108 that may communicate with the sensor system to receive signals indicating the operator presence, and one or more actuators 110 that may move (e.g., open or close) the door. The controller can represent hardware circuitry that includes and/or may be connected with one or more processors (e.g., microprocessors, integrated circuits, field programmable gate arrays, etc.) that control operation of the system as described herein. The actuator(s) can represent motors or other devices that can open or close the door without the operator having to touch the actuator(s), controller, sensor, or door.

The sensor system may include a proximity sensor that detects entry of the operator into a defined area associated with (e.g., in front of) the door. The sensor system may include a sensor that both emits a sensor signal and detects the sensor signal (e.g., detects fluctuations in the signal that are indicative of detecting a person). Alternatively, the sensor system may include a sensor emitter that emits the sensor signal, and a separate sensor detector that senses/detects changes in the sensor signal. In one example, the sensor system can include an electromagnetic (EM) radiation sensor. The EM sensor may emit an EM radiation signal and detect changes in the EM radiation signal. Examples of EM radiation signals include infrared (IR), visible light, short wavelength or other radio (e.g., radar), laser, lidar, and so on. In one embodiment, the sensor system may include an infrared radiation (IR) sensor that detects IR, or heat, emitted or coming off an operator while the operator is within a detection curtain or volume of the sensor.

The sensor system may detect entry of or passage of the operator into or through a detection curtain 112. The detection curtain has a trapezoid shape in the illustrated example. This shape may project along an obtuse angle 124 that is less than one hundred eighty degrees and oriented away from the sensor. The shape may extend along this angle from the sensor to opposite or opposing lateral vertical limits or boundaries 126, 128. These lateral boundaries may be parallel to each other and transversely oriented to the floor 114 of the vehicle. In one example, the shape of the detection curtain may be oriented at an acute angle relative to the floor of the vehicle. For example, the lateral boundaries of the detection curtain may intersect the floor of the vehicle with a lower horizontal boundary or limit 130 of the detection curtain extending along the floor from one lateral boundary to the other lateral boundary.

The detection curtain can be a two-dimensional plane (e.g., area) or three-dimensional volume where IR light or other EM radiation is emitted by the sensor system and reflection of the IR light or other EM radiation is detected. Entry of a person or other object across the plane or into the area causes IR light (or other EM radiation) emitted by the sensor system to be reflected back to the sensor system and be detected by the sensor portion of the sensor system. Responsive to detecting entry of the person or object, the sensor can send a signal to the controller, and the controller can generate a signal that directs the actuator to open the door.

The detection curtain may be oriented at the acute angle such that a plane extending between or defined by the lateral boundaries and the horizontal boundary of the detection curtain is oriented at the acute angle that may be closer to ninety degrees than forty-five degrees. Alternatively, the detection curtain may be oriented at ninety degrees to the floor. For example, the detection curtain may be a plane defined by or bounded by the lateral and horizontal boundaries such that an operator on an inboard side of the detection curtain (e.g., the detection curtain is between the door and the operator) and/or an operator on an outboard side of the detection curtain (e.g., the operator is between the detection curtain and the door) is not detected by the sensor. But movement or the presence of the operator through or in the plane of the detection curtain is sensed by the sensor. The angle at which the detection curtain is oriented may be changed to control when and/or where the presence of an operator is detected. For example, the detection curtain may be more upright (closer to ninety degrees or perpendicular to the floor) to avoid detecting persons farther from the door and to detect persons closer to the door, while tilting the curtain to be less upright (farther from ninety degrees to the floor) to detect persons farther from the door. This angle may be changed to control or limit how far a person has to be from the door before the person is detected. In one embodiment, the sensor may be manually tilted or automatically tilted (e.g., by the controller directing an actuator, such as a motor included in or connected with the sensor) to change the oriented of the detection curtain relative to the floor. This angle may be changed to increase or reduce how many operators are detected, may be changed based on how many persons are onboard the vehicle, etc. For example, the angle may be steeper (closer to ninety degrees to the floor) if too many passengers are detected that are not attempting to open the door and may be less steep (farther from ninety degrees to the floor) if too few passengers are detected that are attempting to open the door.

Optionally, the sensor system may include another type of sensor that can detect the presence or entry of the operator. For example, the sensor may be an ultrasound sensor that emits and detects reflection of sound waves as a person passes the detection curtain, a camera that detects persons within a field of view of the camera, or the like.

The detection curtain may extend to or near the floor 114 on which the operator stands or is walking. This may be a floor of a vehicle, of a building, of a room, or the like. The detection curtain can extend across a width dimension 116 of the door. For example, the closest distance between the lateral boundaries or limits of the detection curtain may be wider than the door. The width dimension of the door may be the width of the opening through which the operator may pass while the door is open and that is closed by the door while the door is closed. The width dimension may not extend to or across side elements of the door portal, such as dividing walls or modesty panels 118. Optionally, the width dimension may be wider than the opening to provide a greater detection area or may be narrower than the opening to prevent unintentional opening of the door. The controller and/or sensor system can be modified or programmed to change the dimensions (e.g., size) of the detection curtain.

The shape and extent of the detection curtain is defined by the configuration of the sensor system (in terms of how it is configured to project EM radiation or the like) and/or the dimensions of the structure around the door (or other device) onto which the detection curtain is generated or projected. In one aspect, as mentioned, the detection curtain may extend to a trapezoidal shape, meaning two furthest edges of the detection curtain, such as an uppermost edge and a lowermost edge, are parallel to one another but have different lengths. In another aspect of a trapezoidal curtain, the boundary of the detection curtain that defines the closest extent of the curtain to the door (or other device) may include one edge or other portion that lies closer to the door than another edge or other portion of the boundary. For example, a topmost edge or point of the detection curtain that faces the door may lie closer to the door than a bottommost edge of the detection curtain that also faces the door. In another embodiment, the extent/boundaries of the detection curtain may be defined by a top edge (relative to a floor or other support surface), such as an uppermost edge which is the edge/portion of the uppermost region of the detection curtain that is closest to the door or other device, and a bottom edge (relative to the floor or other support surface), such as a lowermost edge which is the edge/portion of the bottommost region of the detection that is closest to the door or other device, that is parallel to the top edge, where the top edge is shorter than the bottom edge (and the bottom edge is thereby longer than the top edge) and the top edge is also closer to the door (or other device) than the bottom edge (and the bottom edge is thereby further away from the door or other device than the top edge).

During time periods that the door is in an authorized state, entry of the operator into or across the detection curtain can cause the controller to direct the actuator to open the door without any further or additional operator intervention. The door may be in an authorized state responsive to input being provided to the controller. This input can be received from another controller, from a speed sensor (e.g., that detects whether a vehicle in which the door is located is moving), from input from an operator (e.g., a driver of the vehicle), or the like.

Optionally, the sensor system can include or be coupled with a light generating device, such as a lamp, light emitting diode, or the like, and/or a lens. This example of the sensor system can project light onto the floor or other surface of the vehicle to create a visual indicator 120. This visual indicator may be positioned at an interface between the detection curtain and a surface near the door, such as the floor of the vehicle, room, or building. For example, the visual indicator may be a visible line (or other shape) appearing on the floor to notify operators where the operator must move to or across to be detected by the sensor (to open the door).

The controller can direct the sensor system to change the appearance of the indicator generated by the sensor system to convey information to the operator. For example, the controller can direct the sensor system to change the color of the visual indicator, to include or display text with or as an alternate to the line, or the like, to indicate whether the door is in an authorized state, an unauthorized state, a locked state, an unlocked state, an open state, a closed state, an actuating state, or the like. The door may be in the authorized state while the door is able to be opened or closed by operators. For example, the controller may place the door in the authorized state while a vehicle that includes the door is stationary and/or a driver of the vehicle provides input to indicate the door may be opened. The door may be in the unauthorized state while the door is not able to be opened or closed by operators. For example, the controller may place the door in the unauthorized state while a vehicle that includes the door is moving and/or the driver of the vehicle provides input to indicate the door may not be opened. The door may be in the open state while the door currently is open. The door may be in the closed state while the door currently is closed. The door may be in the actuating state while the door currently is moving between the open state and the closed state. Optionally, the sensor system may generate the visual indicator to include text that notifies persons of the state of the door, to include a logo of a business, to include an advertisement, or the like.

The system can include an output device 122 that presents information to persons at or near the door. This output device can be disposed above or to the side of the door. The controller can send signals to the output device to control what is output by the output device. For example, the output device may be an electronic display, a light (e.g., light emitting diode or another lamp), a speaker, or the like. The controller can direct the output device to present information indicating the state of the door. For example, the output device can present different colors, different sets of text, or the like, to represent different states of the door. Presenting different colors may be more quickly recognized and/or may be recognized by more persons to indicate the state of the door (relative to sets of text). As another example, the output device can continuously display a color indicating a state of the door while the door remains in that state, and switch to a different color when the state of the door changes. The output device can switch between continuously displaying a color to intermittently displaying the same or different color to indicate different states of the door. The color and/or frequency at which the color changes or flashes on and off may be customized by an operator of the controller or the system. Optionally, the output device can switch between displaying information at different brightness to indicate the different states of the door. In one example, the output device can include or be embodied in the sensor system generating the light on the floor or other surface, as described above.

In addition to or as an alternate to opening the door responsive to detecting presence of a person, the controller may send a signal to an output device to notify of the presence of the person. For example, the controller may send a signal to a display device, may generate a sound, may flash lights, or the like, to notify a driver of the vehicle that a person is in the detection curtain. This can be useful to notify the driver of persons that are not authorized to be near the door, such as while the vehicle is moving.

The system optionally can be used to actuate or control other devices. For example, instead of being used to open a door, the system can be used to turn on or off a water faucet, turn on or off a water fountain, call an elevator, or the like. The sensor system may detect the presence of a person or part of the person (e.g., foot) and the controller can turn on the water faucet, turn on the water fountain, call the elevator, etc., responsive to detecting the person. The sensor system may detect exit of the person or part of the person from the detection curtain, and the controller can turn off the water faucet, turn off the water fountain, or the like, responsive to detecting exit of the person.

Figure 3:
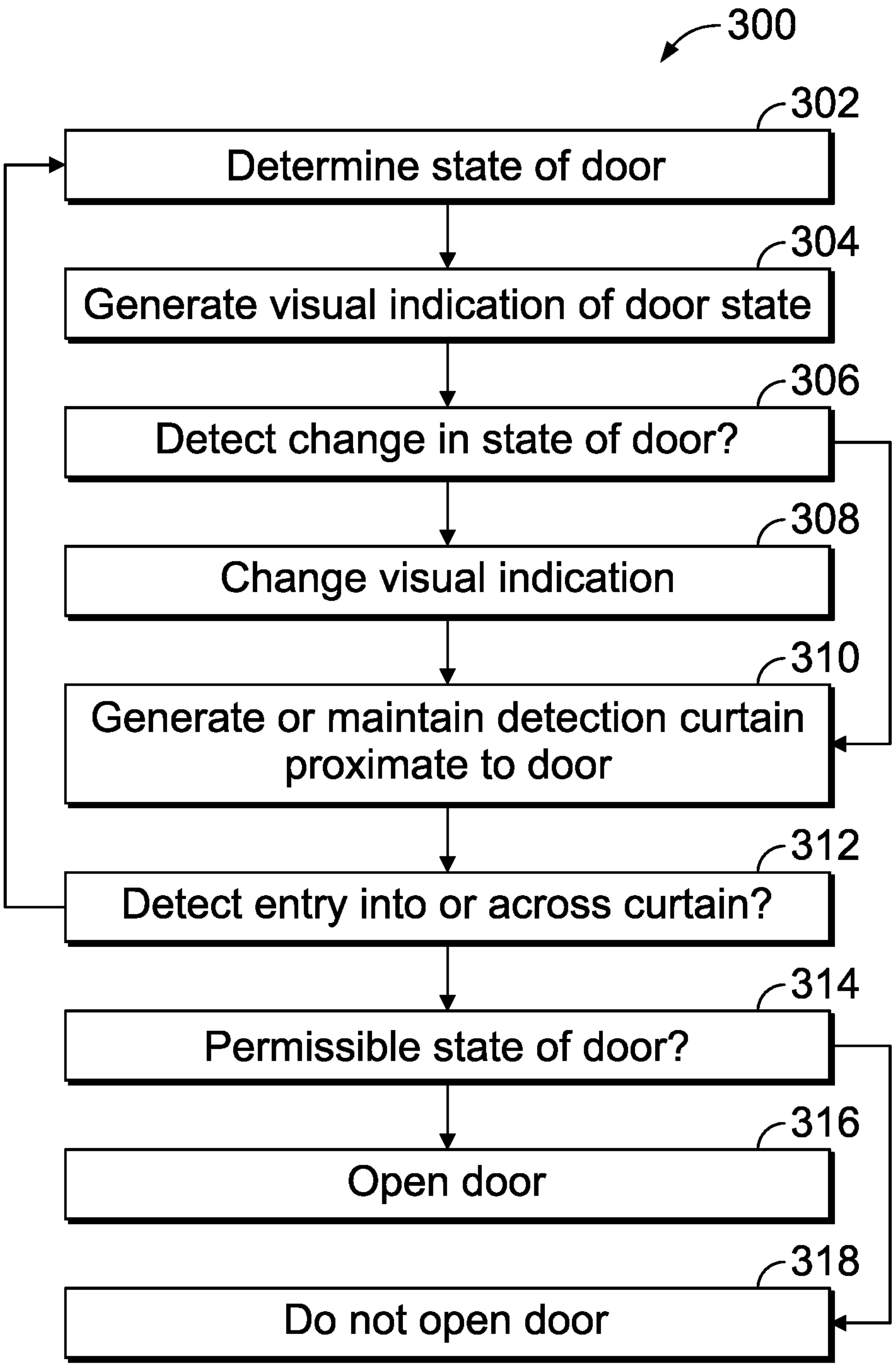
FIG. 3 illustrates a flowchart of one example of a method for controlling touchless operation of a door or other device.

FIG. 3 illustrates a flowchart of one example of a method 300 for controlling touchless operation of a door or other device. The method can represent operations performed by one or more examples or aspects of the system described in connection with FIGS. 1 and 2. At step 302, the state of the door is determined. For example, the state of the door may be determined to be the authorized state while the vehicle is not moving, a driver or operator of the vehicle has provided input indicating the door to be in the authorized state, or the like. The state of the door may be determined to be the unauthorized state while the vehicle is moving and/or the driver provided input indicating the door is in the unauthorized state. The state of the door may be determined to be the locked state while the door is locked, as the unlocked state while the door is unlocked, and the actuating state while the door is moving between open and closed positions or states.

At step 304, a visual indication of the state of the door may be generated. This visual indication can be color, text, or the like, which may be displayed on an electronic display above or to the side of the door, which may be displayed on the floor near (e.g., in front of) the door, or the like. In one example, the visual indication can be created where the detection curtain (described above and below) intersects the floor.

At step 306, a decision may be made as to whether the state of the door has changed. For example, a decision of whether the door has switched between the authorized state and the unauthorized state has occurred, whether the door has switched between the open state and the closed state has occurred, whether the door has switched between the unlocked state and the locked state has occurred, etc. If the door state has changed, then the visual indication may need to be changed. As a result, flow of the method can proceed toward step 308. If the door state has not changed, then the visual indication may not need to be changed. As a result, flow of the method can proceed toward step 310.

At step 308, the visual indication may be changed. For example, the output device and/or sensor system can change the color that may be generated, can switch between a continuous display and an intermittent or flashing display, can change the text that may be displayed, etc. At step 310, the detection curtain may be generated. For example, the sensor system may create the detection curtain on one side of the door (e.g., inside the vehicle) or, if the detection curtain is already being generated, the sensor system may maintain (e.g., keep creating) the detection curtain. At step 312, a decision may be made as to whether a person or object has crossed or entered into the detection curtain. If the person or object has crossed or entered the detection curtain, then this may indicate that the door needs to be opened. As a result, flow of the method can proceed toward step 314. If no person or object has crossed or entered the detection curtain, then this may indicate that the door does not need to be opened. As a result, flow of the method can return toward another step (e.g., step 302) or the method may terminate.

At step 314, a decision may be made as to whether the state of the door allows the door to be opened. For example, responsive to determining that a person or object has crossed the detection curtain, the controller may examine the current state of the door. If the current state is closed and/or authorized, then flow of the method can proceed to step 316 where the controller may direct the actuator to open the door. This allows for the door to be safely opened without the person having to touch any part of the door. But if the current state of the door is open or unauthorized, then flow of the method can proceed to step 318 where the controller may not need to direct the actuator to open the door (as the door is already open) or the controller may not allow the actuator to open the door. This can prevent the door from being opened during an unsafe situation, such as while the vehicle is moving, while the vehicle is not a platform or other location where the person can safely get off the vehicle without falling, etc. Flow of the method can then return to a prior step (e.g., step 302) or may terminate.

Operations of the method can be performed simultaneously or concurrently. For example, the steps related to determining and displaying the state of the door (e.g., steps 302 through 308) and the steps related to detecting a person near the door (e.g., steps 310 through 318) may be performed at the same time or during overlapping time periods.

In embodiments, the system may be configured so that determinations of having detected entry of a person or object into or through the detection curtain (sensor signal) for opening a door are additionally based on a length of time the detection curtain may be deemed as having been entered. For example, the system may have a designated time threshold, and if the detected or determined length of time of curtain entry is longer than the threshold, the sensor system can send a signal to the controller, and the controller can generate a signal that directs the actuator to open the door. On the other hand, if the length of time is shorter than the threshold, the sensor system does not send such a signal for opening the door. The designated time threshold may be relatively small, such as one or two seconds. Such a time threshold (for registering a person as having entered the detection curtain for opening the door) may help alleviate "false positives" of when objects such as purses or umbrellas inadvertently briefly move into the detection region of the detection curtain. Persons or other operators may be made aware of the time threshold by virtue of the system being configured to change a displayed visual and/or audio indicator from a first state where the visual or other indicator indicates the door has not been signaled for opening and a different, second state where the visual or other indicator indicates the door has been signaled for opening, e.g., yellow and green, respectively, or red and green respectively, or no sound and a designated chime, voice phrase, or the like, respectively.

In other embodiments, the system may look at aspects of the sensor signal other than a length of time the detection curtain is entered, for determining whether to generate a control signal or signals for opening the door. For example, a number of times the detection curtain is entered during a designated time period, or where the detection curtain is entered. Regarding the former, multiple entries during a designated time period may be indicative of plural persons signaling to open the door, and regarding the latter, entry at the very top or towards the bottom of the detection curtain, but higher than typical shoe height, may be indicative of false positives. Keeping in mind that due to height variances in people, the system may be configured to correlate or verify possible false positives using other data, such as data from cameras.

While one or more embodiments are described in connection with a rail vehicle system, not all embodiments are limited to rail vehicle systems. Unless expressly disclaimed or stated otherwise, the inventive subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

In one embodiment, the door system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the door or device control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model may be selected, and the vehicle controller executes that plan to achieve the desired input data to mirror the predicted best outcome scenario. Additionally, the success metric may be a combination of the optimized outcomes, which may be weighed relative to each other. During plan execution, operational and other data (or other parameters) may be sensed or otherwise generated and stored in memory. The data stored in memory may subsequently be used as a basis for at least partially re-training the neural network, with the neural network subsequently generating a new output or outputs potentially based on both the original parameters and/or the stored data. This process may be repeated iteratively and/or during ongoing operation of the vehicle or other machine or device in question, to automatically re-train and renew the models in question for improved control outcomes over time.

In one embodiment, a policy engine for a door control system may include a policy (e.g., rules set) specifying controlling opening of a door if designated conditions are met, as discussed above (e.g., analysis of the signal generated by the sensor system indicating the EM radiation detection curtain has been broken by a person wanting to open the door, the vehicle, etc. being in an operational condition, e.g., stopped, where it is permissible to open the door, and so on). A neural network may be established, which receives input of various operational parameters including vehicle operational status, the state of the sensor system signal (e.g., detection curtain), and potentially other data such as camera data, passenger occupancy sensing data, and data indicating people exiting the door within a time frame of when the door is opened (e.g., the time frame being the time between when the door is opened and the immediate next instance of the door closing). The neural network is trained to predict occurrences of combinations of data that are indicative of when the door should be opened, and generates control signals accordingly. Over time, additional operational data is sensed and stored in memory, and this data is used to re-train the neural network. For example, data of situations where the control system has determined that the boundaries of the detection curtain have been penetrated by a person (i.e., a person has entered the detection curtain) may be correlated to data of when the door is subsequently opened and one or more persons actually exit through the door (during that time period of from when the door is opened to when the door is next immediately closed), versus situations or instances of no one actually exiting the door. This may allow the control system to assess the quality or nature of fluctuations in the sensor system signal (e.g., IR or other EM radiation) over time for eliminating "false positives" and/or controlling door opening differently than under other conditions. For example, in an embodiment where the system does not control the door open until the detection curtain has been entered for at least a designated time period, the designated time period may be based on, and variable, as a function of the assessment or determination of the sensor signal. For example, if the sensor signal has been determined to have a higher likelihood of being a false positive, then the designated time period may be longer than if the sensor signal has been determined as having a lower likelihood of being a false positive.

In one example, a control system is provided that includes a sensor system that may detect entry of a person into a detection curtain in front of a door, and a controller that may receive a first signal from the sensor system indicating the entry of the person into the detection curtain. The controller may determine a state of the door and generate a second signal responsive to receiving the first signal and while the state of the door indicates that the door can be opened. The control system also may include one or more actuators that may be coupled with the door and to open the door without the person touching the door responsive to receiving the second signal from the controller.

The sensor system may generate the detection curtain as electromagnetic (EM) radiation. At least a portion of the detection curtain may be no closer than 1 cm to the door such that the sensor system may detect the entry of the person into the detection curtain without the person coming within 1 cm of the door. The sensor system may generate at least one of a visual indicator representative of a location of the detection curtain and/or a visual indicator representative of the state of the door.

The control system also may include an output device that may be controlled by the controller to generate a visual indicator representative of the state of the door. The sensor system may generate a light on a floor of a vehicle inside of the door that represents a location of the detection curtain and/or the state of the door. The controller may control the sensor system to generate light and/or control an output device to display the light in a color that indicates the state of the door. The controller may direct one or more of the sensor system or the output device to (a) change the color of the light, (b) switch from a continuous generation of the light to an intermittent generation of the light, and/or (c) switch from the intermittent generation of the light to the continuous generation of the light responsive to the state of the door changing.

The sensor system may include an infrared sensor and the detection curtain may be a two dimensional plane of the EM radiation. The EM radiation may include infrared light, in which the infrared sensor emits the infrared light for detection of the person.

In another example, a method is provided that includes generating a detection curtain in front of a door using a sensor system, detecting entry of a person into the detection curtain, determining whether a state of the door indicates that the door can be opened, and opening the door without the person touching the door using one or more actuators responsive to detecting entry of the person into the detection curtain and determining that the state of the door indicating that the door can be opened.

The detection curtain may include EM radiation and at least a portion of the detection curtain may be generated no closer than 1 cm to the door such that entry of the person into the detection curtain is detected without the person coming within 1 cm of the door. The method also may include generating a visual indicator representative of a location of the detection curtain and/or a visual indicator representative of the state of the door. The method also may include generating a light on a floor of a vehicle inside of the door that represents one or more of a location of the detection curtain or the state of the door.

The method may include changing a color of the light responsive to the state of the door changing and/or switching between from continuous generation of the light to intermittent generation of the light responsive to the state of the door changing. The light may be generated by the sensor system or an output device disposed near the door. The EM radiation of the detection curtain may include infrared light generated by the sensor system along a two dimensional plane.

In another example, a control system is provided that includes a sensor system that may detect entry of a person into a detection curtain in front of a device, and a controller that may identify the entry of the person into the detection curtain based on output from the sensor system. The controller may determine a state of the device and to output a signal responsive to identifying the entry of the person into the detection curtain and the state of the device indicating that the device can be actuated. The control system may include one or more actuators that may be coupled with the device and may change the state of the device without the person touching the device responsive to receiving the signal from the controller.

The device may be a door of a transit vehicle. The sensor system may generate at least one of a visual indicator representative of a location of the detection curtain or a visual indicator representative of the state of the device. The sensor system may generate the detection curtain as EM radiation, and at least a portion of the detection curtain is no closer than 1 cm to the device such that the sensor system is configured to detect the entry of the person into the detection curtain without the person coming within 1 cm of the device.

As used herein, the terms “processor” and “computer,” and related terms, e.g., “processing device,” “computing device,” and “controller” may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term “non-transitory computer-readable media” represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms “a”, “an”, and “the” include plural references unless the context clearly dictates otherwise. “Optional” or “optionally” means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as “about,” “substantially,” and “approximately,” may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

Where any or all of the terms “comprise”, “comprises”, “comprised” or “comprising” are used in this specification (including the claims) they are to be interpreted as specifying the presence of the stated features, integers, steps or components, but not precluding the presence of one or more other features, integers, steps or components.

A reference herein to a patent document or any other matter identified as prior art, is not to be taken as an admission that the document or other matter was known or that the information it contains was part of the common general knowledge as at the priority date of any of the claims.

What is claimed is:

1. A system comprising:

a sensor system configured to detect entry of a person into a detection curtain in front of a door;

a controller configured to receive a first signal from the sensor system indicating the entry of the person into the detection curtain, the controller also configured to determine a state of the door, wherein the state of the door indicates whether the door is open, closed, or actuating and whether the door is locked or unlocked, the controller configured to determine that the door is authorized to open based on the state of the door;

the controller configured to generate a second signal, responsive to receiving the first signal and determining that the door is authorized to open; and one or more actuators configured to be coupled with the door and to open the door without the person touching the door responsive to receiving the second signal from the controller.

2. The system of claim 1, wherein the sensor system is configured to generate the detection curtain as electromagnetic (EM) radiation, and wherein at least a portion of the detection curtain is no closer than 1 cm to the door, such that the sensor system is configured to detect the entry of the person into the detection curtain without the person coming within 1 cm of the door.

3. The system of claim 2, wherein the sensor system is configured to generate at least one of a visual indicator representative of a location of the detection curtain or a visual indicator representative of the state of the door.

4. The system of claim 2, further comprising an output device configured to be controlled by the controller to generate a visual indicator representative of the state of the door.

5. The system of claim 2, wherein the sensor system is configured to generate a light on a floor of a vehicle inside of the door that represents one or more of a location of the detection curtain or the state of the door.

6. The system of claim 2, wherein the controller is configured to one or more of control the sensor system to generate light or control an output device to display the light in a color that indicates the state of the door.

7. The system of claim 6, wherein the controller is configured to direct one or more of the sensor system or the output device to one or more of (a) change the color of the light, (b) switch from a continuous generation of the light to an intermittent generation of the light, or (c) switch from the intermittent generation of the light to the continuous generation of the light responsive to the state of the door changing.

8. The system of claim 2, wherein the sensor system comprises an infrared sensor, and the detection curtain is a two dimensional plane of the EM radiation, the EM radiation comprising infrared light, in which the infrared sensor emits the infrared light for detection of the person.

9. A system comprising:

a sensor system configured to detect entry of a person into a detection curtain in front of a device;

a controller configured to identify the entry of the person into the detection curtain based on an output from the sensor system, the controller also configured to determine a state of the device, wherein the state of the device indicates whether the device is open, closed, or actuating and whether the device is locked or unlocked, the controller configured to determine that the device is authorized to be actuated;

the controller configured to generate a signal, responsive to detecting entry of the person into the detection curtain and determining that the device is authorized to open; and one or more actuators configured to be coupled with the device and to change the state of the device without the person touching the device responsive to receiving the signal from the controller.

10. The system of claim 9, wherein the device is a door of a transit vehicle.

11. The system of claim 9, wherein the sensor system is configured to generate at least one of a visual indicator representative of a location of the detection curtain or a visual indicator representative of the state of the device.

12. The system of claim 9, wherein the sensor system is configured to generate the detection curtain as electromagnetic (EM) radiation, and wherein at least a portion of the detection curtain is no closer than 1 cm to the device, such that the sensor system is configured to detect the entry of the person into the detection curtain without the person coming within 1 cm of the device.

* * * * *